United States Patent
Shim et al.

(10) Patent No.: US 9,738,038 B2
(45) Date of Patent: Aug. 22, 2017

(54) MOBILE TERMINAL

(71) Applicant: LG ELECTRONICS INC., Seoul (KR)

(72) Inventors: Hongjo Shim, Seoul (KR); Sanghyun Eim, Seoul (KR); Jumin Chi, Seoul (KR); Gukchan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/961,458

(22) Filed: Dec. 7, 2015

(65) Prior Publication Data
US 2016/0330431 A1 Nov. 10, 2016

(30) Foreign Application Priority Data
May 6, 2015 (KR) .................. 10-2015-0063267

(51) Int. Cl.
*G06T 7/579* (2017.01)
*B29C 67/00* (2017.01)
*H04N 1/00* (2006.01)
*H04N 13/02* (2006.01)

(52) U.S. Cl.
CPC .......... *B29C 67/0088* (2013.01); *G06T 7/579* (2017.01); *H04N 1/00236* (2013.01); *H04N 1/00278* (2013.01); *H04N 13/0239* (2013.01); *G06T 2207/10016* (2013.01); *G06T 2207/10048* (2013.01); *H04N 2201/0084* (2013.01); *H04N 2201/0096* (2013.01)

(58) Field of Classification Search
CPC ................................................. H04N 13/0203
See application file for complete search history.

(56) References Cited

U.S. PATENT DOCUMENTS

| 5,353,393 | A | * | 10/1994 | Bennett | ............... G06T 11/00 345/641 |
|---|---|---|---|---|---|
| 2001/0053304 | A1 | * | 12/2001 | Noda | ............... G06F 3/1204 400/578 |
| 2002/0071038 | A1 | * | 6/2002 | Mihelcic | ............ G01B 11/2518 348/207.99 |
| 2005/0104241 | A1 | | 5/2005 | Kritchman et al. | |
| 2007/0172112 | A1 | * | 7/2007 | Paley | ............... A61B 5/4547 382/154 |
| 2007/0242280 | A1 | * | 10/2007 | Dickinson | ............ G01B 11/005 356/620 |

(Continued)

FOREIGN PATENT DOCUMENTS

KR 10-2009-0012874 A 2/2009

OTHER PUBLICATIONS

Makerbot, "Digitizer Desktop 3D Scanner User Manual," available at https://images.makerbot.com/support/production/mt91.pdf, 2013, pp. 1-74.

*Primary Examiner* — Ibrahim Siddo
(74) *Attorney, Agent, or Firm* — Birch, Stewart, Kolasch & Birch, LLP

(57) ABSTRACT

A mobile terminal including a main body; a display unit disposed on one surface of the main body; a 3D camera configured to capture an image of a 3D shape disposed together with reference markers; a controller configured to create scan data, based on distances to the image from the reference markers, and display a scan image of the 3D shape, based on the scan data.

20 Claims, 21 Drawing Sheets

(56) References Cited

U.S. PATENT DOCUMENTS

| | | | |
|---|---|---|---|
| 2011/0025843 A1* | 2/2011 | Oggier | G01S 7/4814 |
| | | | 348/135 |
| 2011/0288838 A1* | 11/2011 | Hamatani | G01N 3/00 |
| | | | 703/6 |
| 2011/0304695 A1* | 12/2011 | Lim | H04N 13/0409 |
| | | | 348/46 |
| 2013/0135312 A1 | 5/2013 | Yang et al. | |
| 2013/0329258 A1* | 12/2013 | Pettis | F16M 13/022 |
| | | | 358/1.15 |
| 2014/0210856 A1 | 7/2014 | Finn et al. | |
| 2015/0238493 A1* | 8/2015 | Yu | A61K 31/522 |
| | | | 514/171 |

* cited by examiner

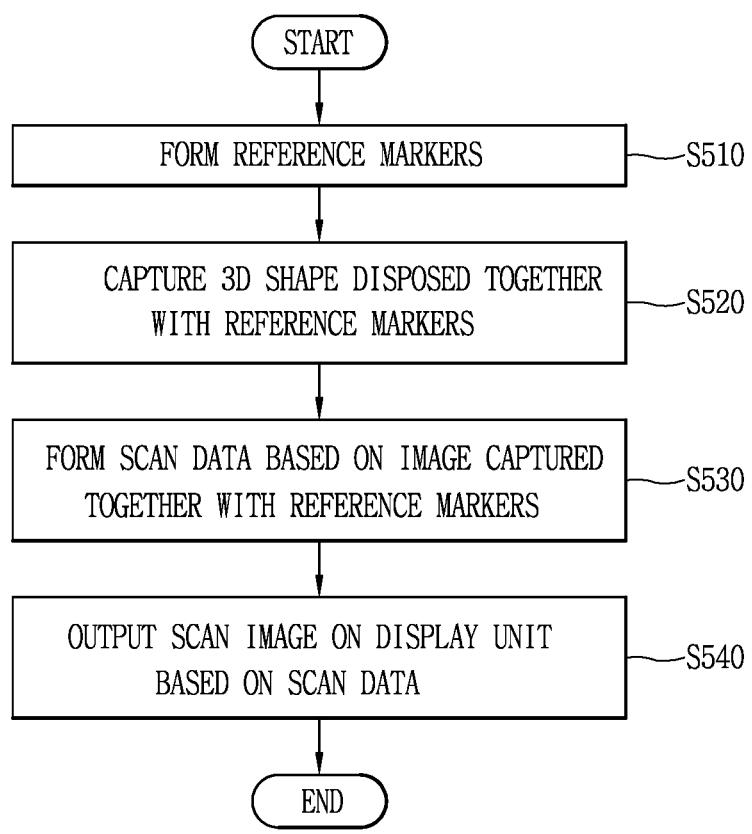

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2015-0063267, filed in Republic of Korea on May 6, 2015, the contents of which is incorporated by reference herein in its entirety.

BACKGROUND OF THE INVENTION

1. Field of the Invention

The present disclosure relates to a mobile terminal including a camera for capturing a 3D shape.

2. Description of the Conventional Art

Terminals can be generally classified as mobile/portable terminals or stationary terminals. Mobile terminals can also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Various attempts have been made to implement complicated functions in such a multimedia device using hardware or software.

In addition, 3D printers for printing 3D objects have recently been developed. Such a 3D printer prints a 3D object by using previously created printing data of the 3D object. Alternatively, the 3D printer may capture a 3D shape of a 3D object by using a 3D scanning device, and print the 3D object by using printing data created from the captured 3D shape of the 3D object.

However, the previously created printing data has limitations to its kind, and it is difficult to receive printing data for printing a 3D object which a user intends to reproduce as it is. In addition, printing data for complementing a damaged area in the 3D shape of the 3D object cannot be provided to the previously created printing data. Further, the 3D scanning device is high-priced, and an ordinary user has difficulty in operating or carrying the 3D scanning device.

SUMMARY OF THE INVENTION

Therefore, an aspect of the detailed description is to provide a mobile terminal which captures an image of a 3D object by using a camera and forms printing data of a 3D object through the captured image.

To achieve these and other advantages and in accordance with the purpose of this specification, as embodied and broadly described herein, a mobile terminal includes: a main body; a display unit disposed on one surface of the main body; a 3D camera configured to capture an image of a 3D shape disposed together with reference markers; a data forming unit configured to form scan data, based on distances to the image from the reference markers included in the image; and a controller configured to control the display unit to output a scan image of the 3D shape, based on the scan data.

In one embodiment, when a restoration requirement area is detected, restoration data may be formed by using the scan data, or may be formed through a restoration image received from a predetermined server, based on the kind of the 3D shape. An area corresponding to the restoration image may be selectively printed. Accordingly, a user can capture a 3D shape and prints the captured 3D shape as it is. In addition, the user can obtain a printing object for the 3D shape in which a restoration area is optimized.

In one embodiment, the controller may control the display unit to output a guide image for forming printing data or restoration data. Accordingly, the user can additionally capture a desired area, thereby collecting more accurate scan data.

According to the present disclosure, scan data of a 3D shape is formed by using the camera of the mobile terminal, and a scan image using scan data is output on the display unit, so that the user can immediately identify a captured image.

Also, restoration data for an area in which restoration is required is formed based on scan data, and a portion of a 3D shape including a restoration requirement area is selective provided as printing data, so that the user can print a desired area.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWING

The accompanying drawings, which are included to provide a further understanding of the disclosure and are incorporated in and constitute a part of this specification, illustrate embodiments and together with the description serve to explain the principles of the disclosure.

In the drawings:

FIG. 2A is a flowchart illustrating a control method of forming scan data of a 3D shape by using the mobile terminal according to an embodiment;

DETAILED DESCRIPTION OF EMBODIMENTS

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
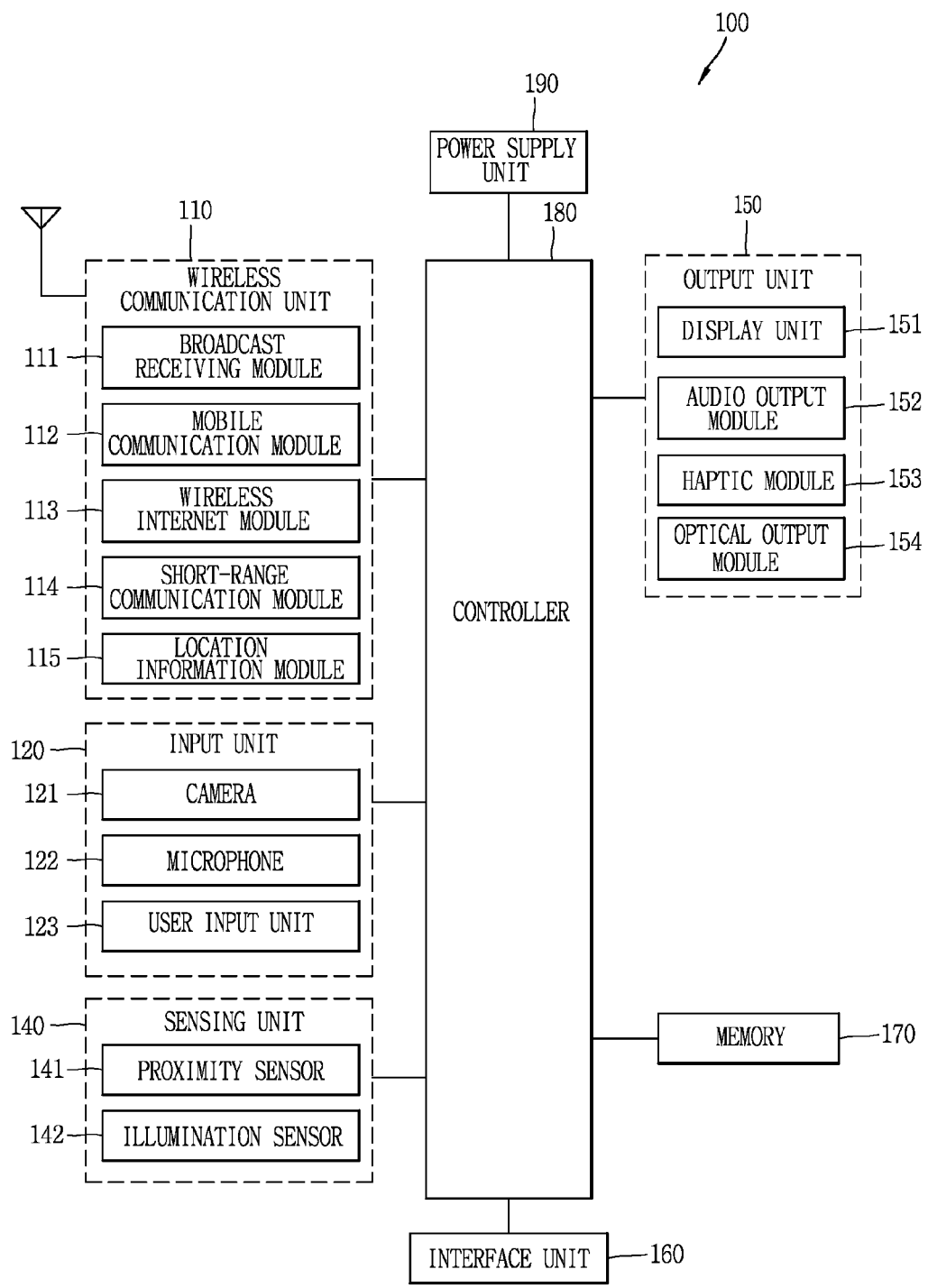
FIG. 1A is a block diagram illustrating a mobile terminal according to the present disclosure.
Figure 1B:
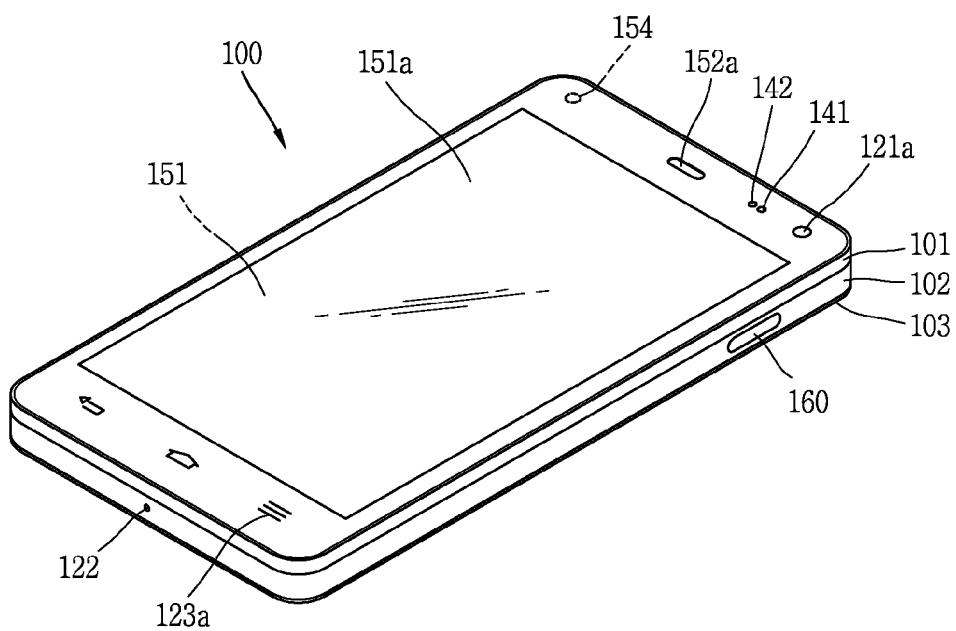
FIGS. 1B and 1C are conceptual diagrams illustrating an example of the mobile terminal according to the present disclosure, viewed in different directions.
Figure 1C:
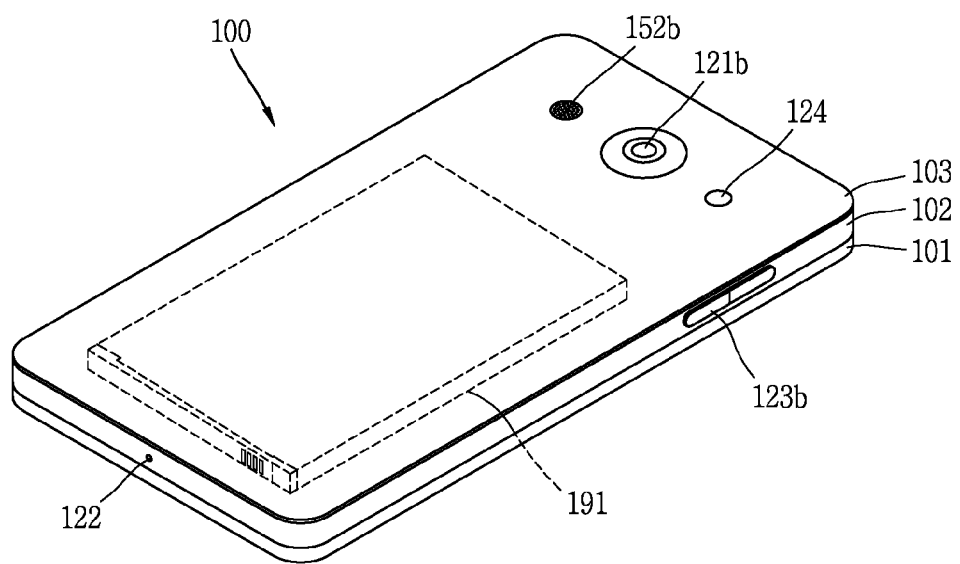

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 can have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 can display execution screen information of an application program executing at the mobile terminal 100 or user interface (UI) and graphic user interface (GUI) information in response to the execution screen information.

In some embodiments, the display unit 151 can be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 can be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 can be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 can be implemented using two display devices, which can implement the same or different display technology. For instance, a plurality of the display units 151 can be arranged on one side, either spaced apart from each other, or these devices may be integrated, or these devices may be arranged on different surfaces.

The display unit 151 can also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 can also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal according to the present disclosure forms an image of a 3D shape. Therefore, the front and rear cameras 121a and 121b according to the present disclosure are implemented to sense and capture a shape of a 3D subject. The camera 121 is not limited to a method of capturing a shape of a 3D subject. For example, the camera 121 may be implemented using a stereoscopic method of extracting 3D information of a subject by analyzing an image of the subject, using two cameras spaced apart from each other at a predetermined distance, a laser scanner method of extracting 3D information of a subject while moving a laser light source, a time of flight (TOF) method of recognizing an infrared light source, or the like.

Figure 1D:
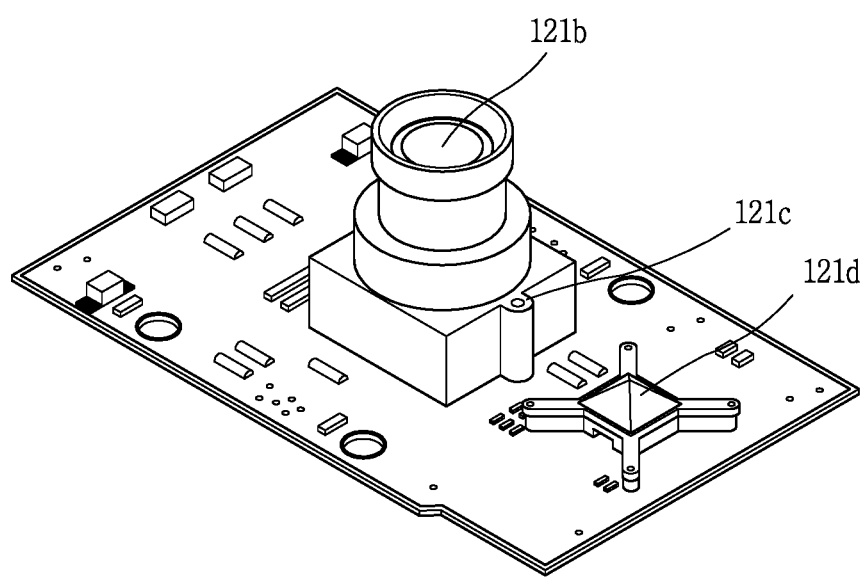
FIG. 1D is a conceptual diagram illustrating a camera unit implemented using a time of flight (TOF) method according to an embodiment.

The TOF method is a method in which an infrared light source and multiple photodiodes are provided to calculate a TOF when the infrared light source is received, thereby implementing a 3D image. FIG. 1D is a conceptual diagram illustrating a camera unit implemented using the TOF method according to an embodiment.

Referring to FIG. 1D, the camera unit according to the embodiment includes a camera lens 121e, a 3D camera sensor 121c, and an IR light source 121d for emitting a light source. If the light source is reflected from a 3D subject, the 3D camera sensor 121c may receive the light source and form a 3D image by using information on a TOF when the light source is received, and an image captured by the 3D camera lens 121e when the light source is received.

The mobile terminal according to an embodiment of the present disclosure forms a 3D image of a 3D object, captured by a 3D camera using the method described above, and forms scan data for printing a 3D object substantially identical to a 3D shape of the 3D object. Hereinafter, a control method of forming scan data and providing a scan image corresponding to the scan data will be described in detail.

Figure 2B:
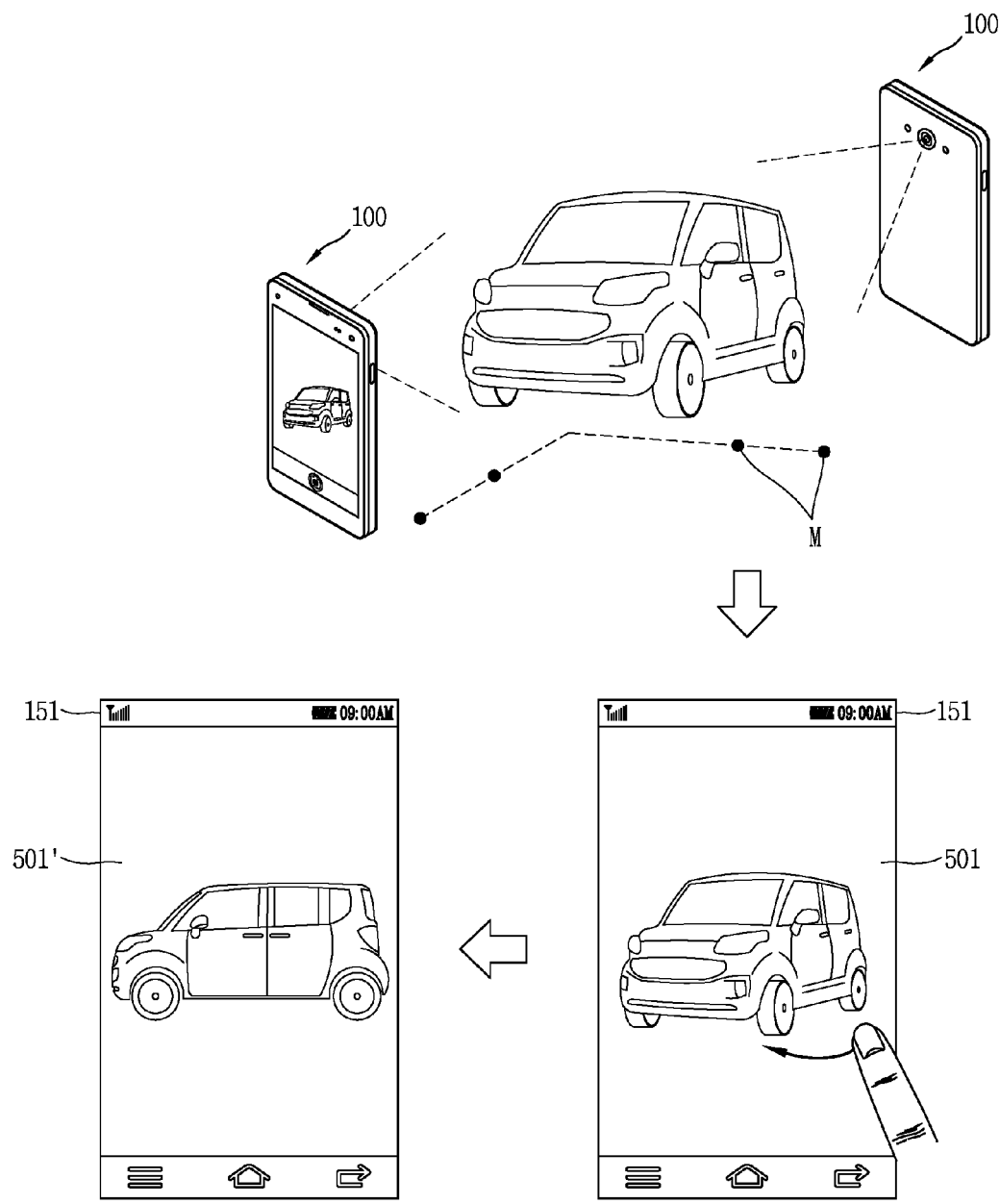
FIG. 2B is a conceptual diagram illustrating the control method of FIG. 2A.

FIG. 2A is a flowchart illustrating a control method of forming scan data of a 3D shape by using the mobile terminal according to an embodiment. FIG. 2B is a conceptual diagram illustrating the control method of FIG. 2A. A reference marker is formed in an area adjacent to the 3D shape (S510).

The 3D shape is disposed in one area in which a plurality of reference markers M are formed. The plurality of reference markers M are arranged to have a predetermined spacing distance. The plurality of reference markers M are sensed together with the 3D object by the camera 121. The reference marker provides a reference coordinate value. Alternatively, the plurality of markers may be attached to the surface of the 3D object.

The 3D camera 121 captures an image of the 3D shape disposed together with the reference markers M (S520). The capturing of the 3D shape is performed plural times. The 3D camera 121 captures, at various angles, the 3D shape fixed using the reference markers M as reference points. The data forming unit forms scan data based on distances between the reference markers M included in the image and the 3D shape (S530). For example, the scan data of the 3D shape is formed using coordinate points of the reference markers M, information on a TOF formed in the capturing of the 3D shape included in the image, and the like.

The display unit 151 outputs a scan image of the 3D shape based on the scan data (S540). The scan image may be configured with a plurality of images which are continuous with each other. The scan image may be implemented as a 2D image or a 3D image.

Referring to FIG. 2B, the 3D camera 121 captures various areas of a subject (vehicle) in various directions including the front and rear of the subject. The captured areas of the subject may overlap with each other. The controller 180 outputs, on the display unit 151, an image of the image in each area and a scan image using the coordinates of a reference marker captured together with the image. For example, the display unit 151 outputs a scan image 501' corresponding to another area of the 3D shape, based on a specific input applied on the scan image 501. Here, the specific touch corresponds to a dragging touch, and the scan image is changed into an image in which the 3D shape rotates, based on the dragging touch.

In addition, the display unit 151 can output, in real time, a scan image through images captured by the 3D camera 121. When scan data or a scan image is not still formed, the controller 180 can neglect the specific touch or control the display unit 151 to output predetermined visual information.

According to the embodiment, scan data of a 3D shape can be formed using a plurality of images captured through the camera of the mobile terminal. Accordingly, a user can receive scan data for 3D printing not by using a separate scanning device but by using a mobile terminal which the user conveniently carries. Also, the user can identify the scan data using the captured images through a scan image output on the display unit 151 of the mobile terminal. Also, the user can identify various areas of the 3D shape based on a touch.

The 3D printer and the mobile terminal can perform wire or wireless communication with each other. When the wire communication is performed, the 3D printer and the mobile terminal can communicate radio signals with each other by sensing when the 3D printer and the mobile terminal are located adjacent to each other through the short-range communication module 114. The positions of the mobile terminal 100 and the 3D printer can be sensed using a Wi-Fi module, etc. Alternatively, the mobile terminal 100 may be controlled to communicate information with the 3D printer through a communication module, based on an identification number of the 3D printer.

Figure 3A:
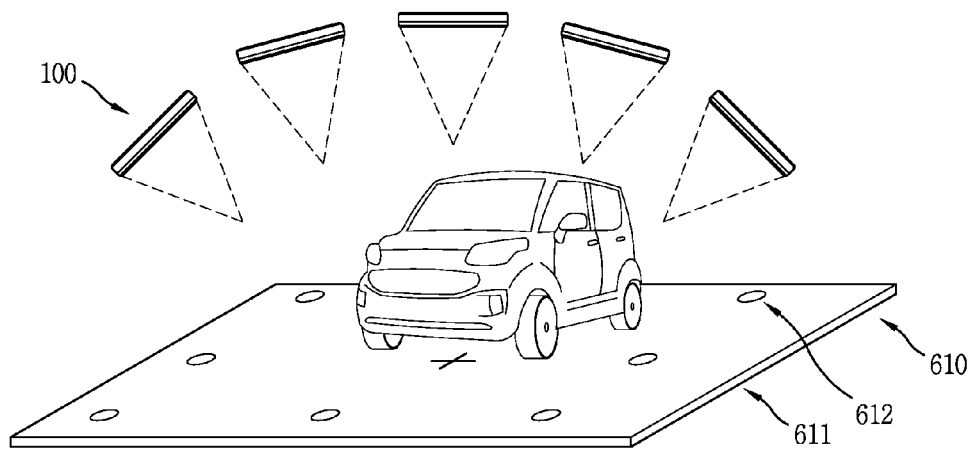
FIGS. 3A to 3C are conceptual diagrams illustrating marker units according to various embodiments.
Figure 3B:
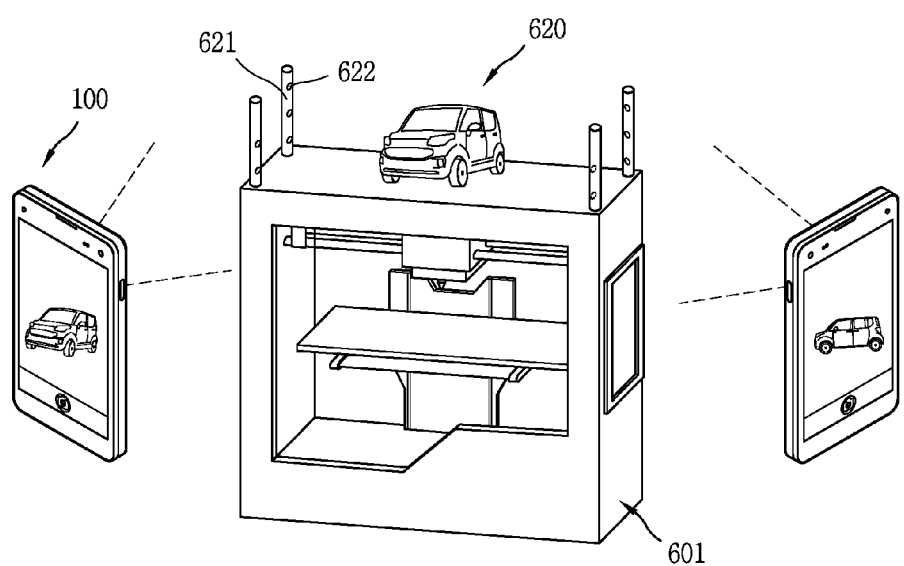
Figure 3C:
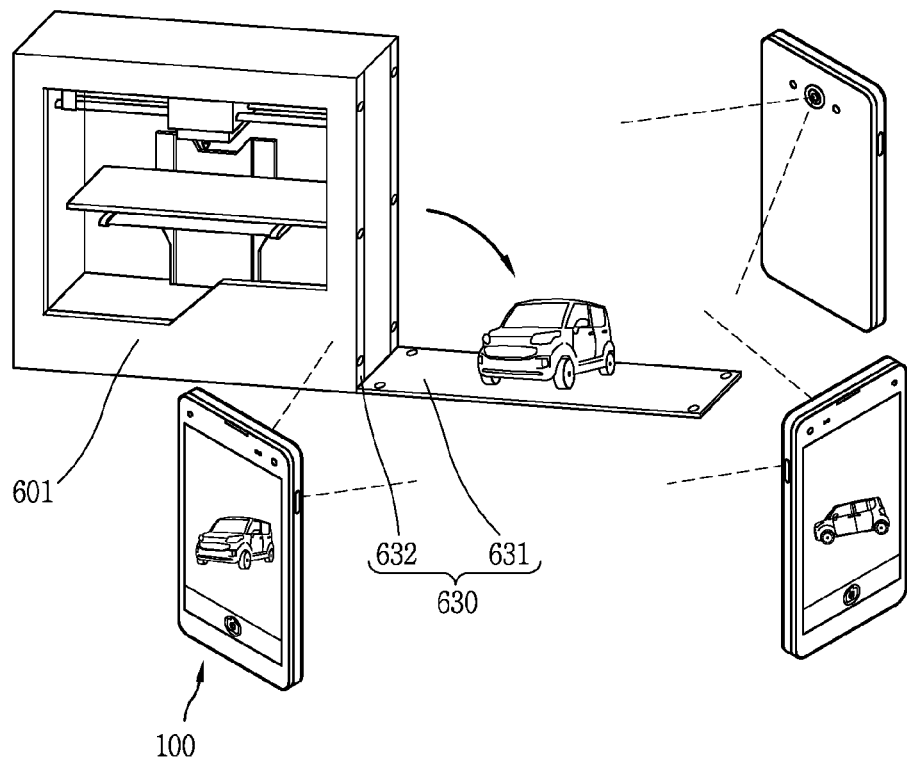

FIGS. 3A to 3C are conceptual diagrams illustrating marker units according to various embodiments. In particular, FIG. 3A is a conceptual diagram of a marker unit according to an embodiment. A first marker unit 610 according to the embodiment includes a plate-shaped support portion 611 and a plurality of reference markers 612. The support portion 611 is formed to support a 3D shape, and may be disposed on the ground. The shape of the support portion 611 is not limited, but preferably formed greater than a subject to be captured.

The plurality of reference markers 612 are arranged at a predetermined distance in one area of the support portion 611. The plurality of reference markers 612 include a center marker x, and the other reference markers 612 can form a regular arrangement about the center marker x. The 3D shape can be disposed over the center marker x, but the present disclosure is not limited thereto. Coordinates of the plurality of reference markers 612 are determined based on the center marker x.

Alternatively, the mobile terminal 100 can capture the reference markers 612 arranged in an arbitrarily arrangement before the 3D shape is disposed. The camera of the mobile terminal 100 can first calculate distances between the arbitrarily arranged reference markers by using an IR source, based on a TOF of the reference markers, a long distance auto focus (LDAF), etc. The plurality of reference markers may be distinguished from one another.

However, the first marker unit 610 may be formed with only reference markers arranged on the ground. When the 3D shape is disposed on the first marker unit 610, the mobile terminal can capture images above the 3D shape. The 3D camera can predict a distance between the 3D camera and the 3D shape when the 3D camera captures images by using TOF information using the IR light source.

The controller 180 forms scan data of the captured images, based on the coordinates of the reference markers 612. In addition, the mobile terminal 100 can include a movement sensor for sensing a movement of the main body of the mobile terminal 100. The scan data may be formed by additionally using information on a capturing angle at which an image is captured based on the movement sensor.

Referring to FIG. 3B, a second marker unit 620 according to an embodiment is integrally formed with a 3D printer 601. The 3D printer 601 includes a supply portion for supplying a material, a supply line for moving the material, a nozzle portion for outputting the material and forming a printing object, and a body portion for accommodating a worktable supporting the printing object. The body portion may be formed in a hexahedral shape.

The second marker unit 620 includes a plurality of marker bars 621 on the 3D printer 601 and at least one reference marker 622 formed on the marker bar 621. The plurality of marker bars 621 are formed in parallel to each other on the 3D printer 601. The plurality of marker bars 621 are spaced apart from each other at a predetermined distance.

The reference markers 622 may be distinguished from one another, and include different information. For example, if the reference marker 622 may be recognized by the 3D camera 121 of the mobile terminal 100, the controller 180 can predict the position and shape of an image captured together with the reference marker 622, based on information corresponding to the reference marker 622. The information corresponding to the reference marker 622 may be stored in the memory 170, or may be received from a server. The information may include coordinates of the corresponding reference marker, a direction of the corresponding reference marker, a height of the corresponding reference marker from a reference point, a distance of the corresponding reference marker from the reference point, etc.

The marker bars 621 may include different numbers of reference markers 622. The reference markers 622 may be arranged at positions symmetric to each other, but the present disclosure is not limited thereto. The height of the marker bar 621 is preferably formed greater than that of the 3D shape. According to the embodiment, the mobile terminal can capture a side of the 3D shape surrounded by the marker bars 621.

Further, the second marker unit 620 may further include at least one reference marker formed at an upper portion of the 3D printer 601. The marker bar 621 may include a structure accommodated in the body portion of the 3D printer 601. Alternatively, the marker bars 621 may be accommodated in the 3D printer 601 in a state in which the marker bars 621 lie down at an upper portion of the 3D printer 601.

According to the embodiment, a 3D shape is disposed on the 3D printer 601, and a printing object substantially similar to the 3D shape is printed inside the 3D printer 601 by using scan data of the 3D shape. Accordingly, a user can compare the 3D shape with the printing object, and a separate space for disposing the marker unit is not required. Also, the second marker unit includes the marker bars, and thus the side of the 3D shape can be more accurately captured.

Referring to FIG. 3C, a third marker unit 630 integrally formed with the 3D printer 601 according to an embodiment will be described. The third marker unit 630 includes a support portion 631 mounted one a side surface of the 3D printer 601 and a plurality of reference markers 632 formed on the support portion 631 and the side surface of the 3D printer 601. The support portion 631 is formed to support the 3D shape. The support portion 631 is mounted to be rotatable from the side surface of the 3D printer 601. When the 3D shape is not captured, the support portion 631 may be accommodated in the 3D printer 601 in a state in which the support portion 631 is overlapped with the side surface of the 3D printer 601.

The reference markers 632 are formed in an area in which the support portion 631 and the side surface are opposite to each other. The reference markers 632 are arranged to be spaced apart from each other at a predetermined distance. The reference markers 632 may include different information.

The 3D shape is disposed on the support portion 631. The 3D shape is located adjacent to the side surface of the 3D printer 601. That is, the third marker unit 630 includes reference markers disposed adjacent to lower and side portions of the 3D shape, and thus each area of the 3D shape can be more accurately captured. The marker unit 630 according to the embodiment may further include marker bars including the reference markers.

Figure 4A:
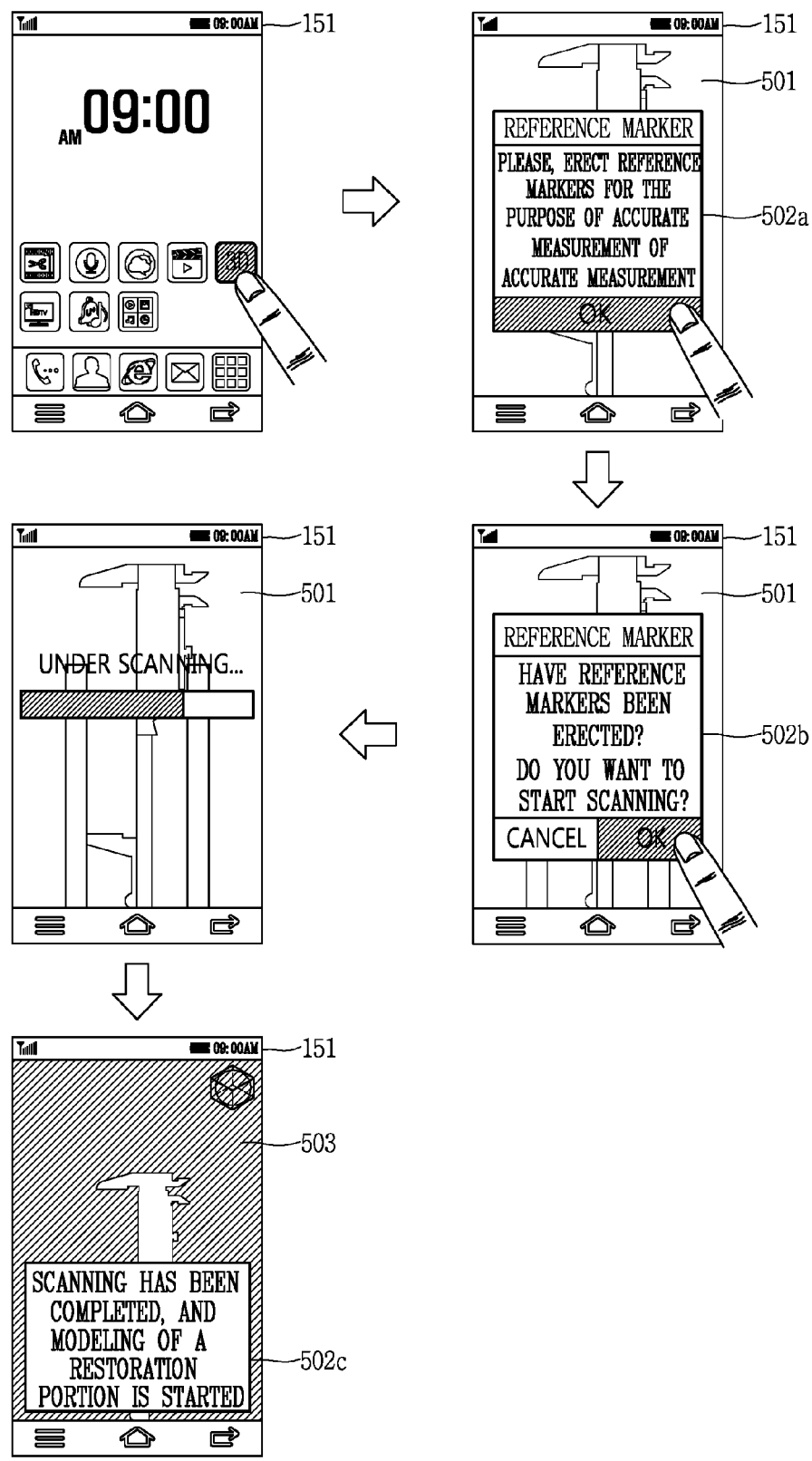
FIGS. 4A to 4C are conceptual diagrams illustrating methods of forming scan data of 3D shapes according to various embodiments.
Figure 4B:
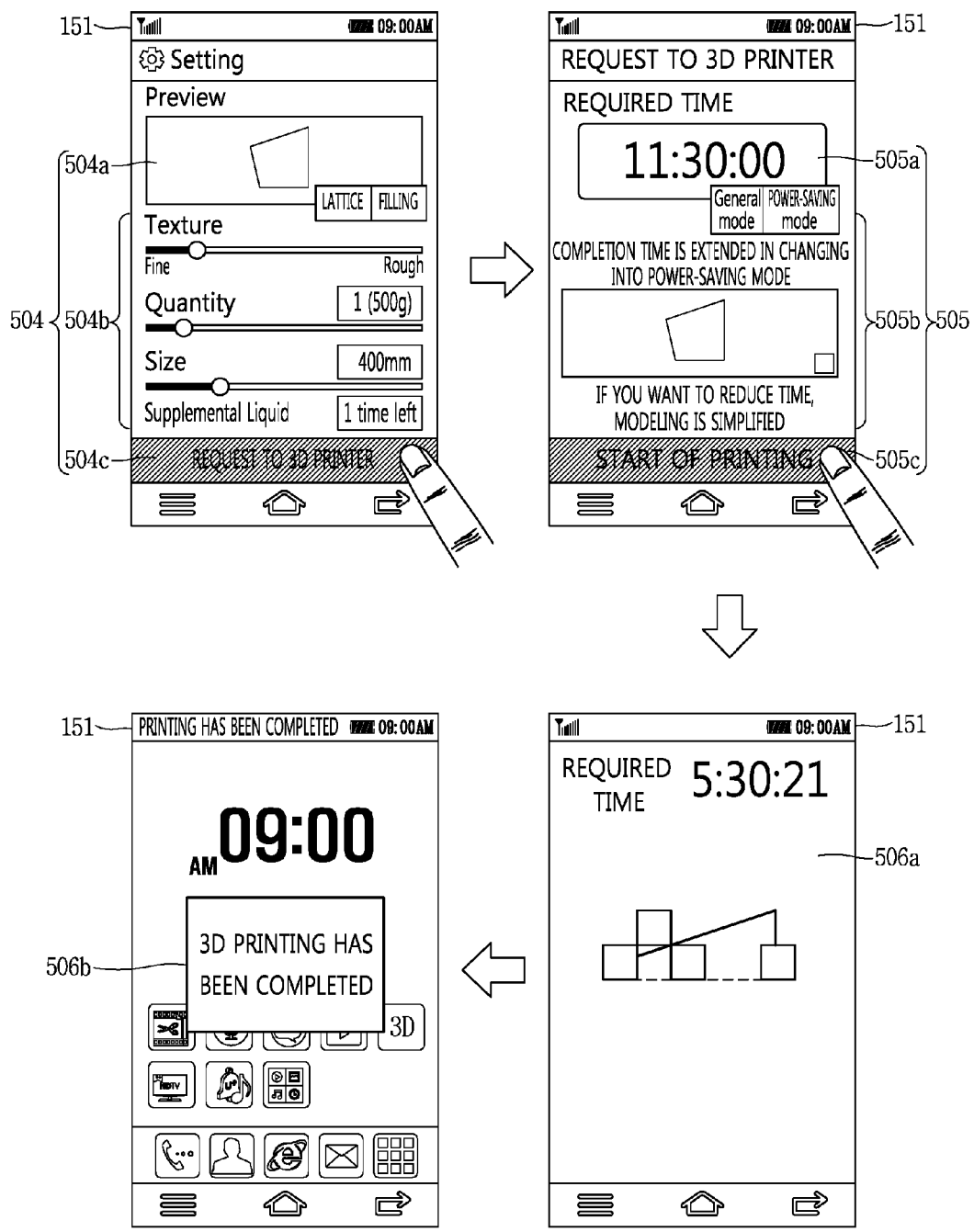
Figure 4C:
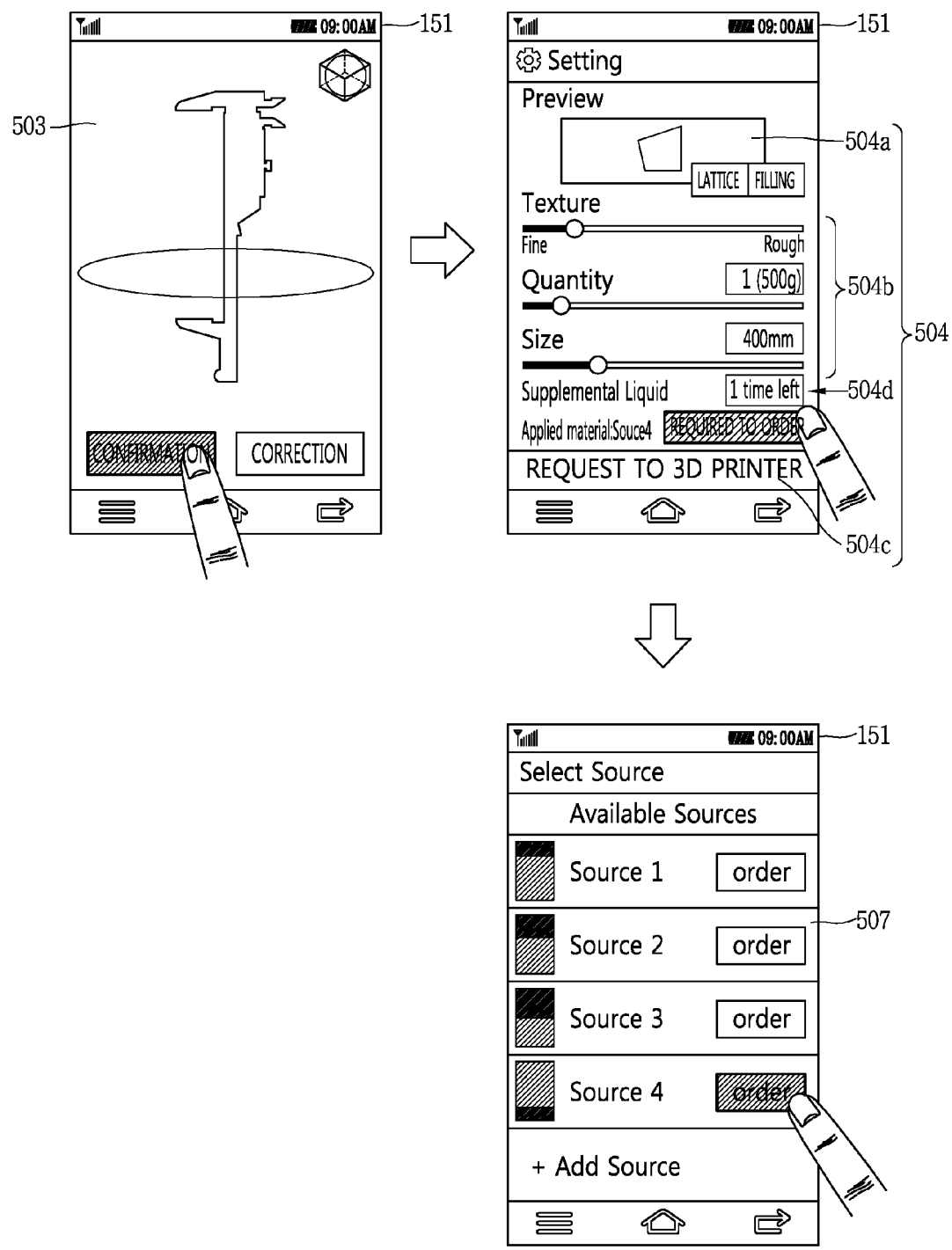

Hereinafter, a control method of the mobile terminal which captures a 3D shape by using a marker unit and forms scan data of the captured 3D shape will be described. In particular, FIGS. 4A to 4C are conceptual diagrams illustrating methods of forming scan data of 3D shapes according to various embodiments. Referring to FIG. 4A, a 3D scanning application can be executed based on a user's control command For example, the display unit 151 outputs an icon corresponding to the 3D scanning application, and the controller 180 can execute the application based on a touch input applied to the icon.

However, the control method of the mobile terminal executing the application is not limited thereto. For example, when it is sensed that the 3D printer is located in an area adjacent to the mobile terminal based on the wireless communication, the controller 180 can automatically execute the application, or output a control window for guiding the execution of the application. Alternatively, when the reference marker is sensed in a state in which the camera 121 is activated, the controller 180 can automatically execute the application, or may output a control window for identifying the execution of the application.

If the application is executed, the controller 180 activates the camera 121. The display unit 151 can output first screen information 501 corresponding to a preview image sensed by the camera 121. When any reference mark is not sensed by the camera 121, the controller 180 controls the display unit 151 to output a first guide window 502a for guiding the installation of a reference marker on the first screen information. However, when any reference mark is not sensed by the camera 121, the controller 180 does not output the first screen information 501 but may output only the first guide window 502a.

When the reference marker is sensed by the camera 121, the controller 180 outputs, on the display unit 151, a second guide window 502b for controlling the start of scanning of a 3D shape. The user may execute a scanning function according the second guide window 502b, or may cancel the execution of the application. The controller 180 can output, on the display unit 151, the first screen information 501 corresponding to the preview image while each area of the 3D shape is captured by the camera 121.

The controller 180 can gradually form scan data by using images captured by the camera 121, and output a scan image corresponding to the scan data as the first screen information on the display unit 151. While an image of the 3D shape is captured by the camera 121 or while scan data is formed using the captured image, the display unit 151 can output a graphic image representing an expected time when the scan data is formed.

When the scan data is formed, the controller 180 controls the display unit 151 to output a scan image 503. The scan image 503 may be changed into images captured at various angles based on a user's touch. When the scan data is formed, the controller 180 determines whether a restoration requirement area is included in the 3D shape. When the restoration requirement area is detected, the controller 180 can control the display unit 151 to output a third guide window 502c for guiding that modeling of scan data for restoration is started.

The scan data may be provided by an external device (computer). The data forming unit may be the external device. For example, when a scan image is captured by the camera 121, the controller 180 can control the wireless communication unit 110 to transmit the scan image to the external device. When the external device stores information on the reference marker, etc., faster and more accurate scan data can be provided.

According to the embodiment, the controller 180 can determine whether the image is captured based on whether the reference marker is sensed, and provide the user with information on whether scanning is performed based on the formation of scan data.

FIG. 4B is a conceptual diagram illustrating a control method of controlling a 3D printer by using scan data. The user may control printing of the 3D printer using scan data through a print setting screen 504. The print setting screen 504 may include an image 504a of a printing object using the scan data, printing state information 504b of the printing object, and a printer control icon 504c.

The image 504a of the printing object may be substantially identical to the scan image, and provide a scan image of another area based on a user's touch. The print setting screen 504 may include a graphic image for selecting a structure in which the internal space of the printing object is filled with a printing material or a structure in which the internal space of the printing object is filled with lattice ribs.

The printing state information 504b may include information on a texture of a printing object using the scan data, an amount (number) of the printing object, a size of the printing object, etc. The controller 180 can change the printing state information 504b based on a user's setting. The controller 180 controls the wireless communication unit 110 to transmit printing data including the scan data and setting information of the print setting screen, based on a touch applied to the control icon 504c.

The controller 180 controls the display unit 151 to display second screen information 505 including a required time 505a of printing using the printing data, a first control icon 505b for setting a power saving mode of the mobile terminal while the 3D printer controls printing or simplifying a scanned 3D shape, and a second control icon 505c for instructing the start of printing. The user may change an operating mode of the mobile terminal into a power saving mode of the mobile terminal, and simplify the detailed structure of the 3D shape. The printing data may be formed based on a condition changed according to the second screen information 505.

The controller 180 controls the wireless communication unit 110 to transmit a control command for controlling the start of printing to the 3D printer, based on a touch applied to the second control icon 505c. If the 3D printer starts printing, the controller 180 can receive, in real time, information on the printing of the 3D printer, and may control the display unit 151 to output a first image 506a representing real-time information on the printing. The first image 506a may include a graphic image representing a degree where a printing object is printed, a remaining printing time, etc.

The controller 180 can form the first image 506a, which is changed based on the flow of time, based on the printing data. In this instance, the controller 180 can not receive the real-time information on the printing. If printing completion information is received, the controller 180 outputs, on the display unit 151, a second image 506b for notifying that the printing has been completed. The second image 506b may be displayed in the form of a pop-up window on a specific screen output on the display unit 151. The display unit 151 can output the printing completion information on a status bar.

According to the embodiment, the user may form printing data by additionally providing a print setting to the formed scan data, and control, in real time, printing of the 3D printer by transmitting the printing data to the 3D printer. When information on a process of performing the printing is received or when the printing is completed, the user may receive notification information for notifying that the information has been received or that the printing has been completed. Thus, the mobile terminal can substantially perform the entire process of outputting a 3D object, from the collection of data for a 3D shape to be printed to the notification of printing completion.

FIG. 4C is a conceptual diagram illustrating a control method of filling a printing material when the printing material is insufficient. The display unit 151 outputs, together with the scan image 503, an icon (confirmation) for forming, as printing data, scan data corresponding to the scan image 503, or an icon (correction) for correcting the scan data.

If a touch is applied to the confirmation icon, the controller 180 sets the scan data as printing data, and outputs, on the display unit 151, the print setting screen 504 based on the printing data. The controller 180 detects information on materials required in printing, based on the printing data. The information on the materials may be received from the 3D printer.

When a specific material is insufficient, based on the information on the materials and the printing data (e.g., when the amount of materials remaining in the 3D printer is less than that of materials required according to the amount, quantity or volume of the printing object, based on the printing data), the controller 180 can perform an ordering function of the materials.

The display unit 151 outputs third screen information 507 for performing the ordering function. The third screen information 507 may include a graphic image for displaying kinds of materials required based on the printing data (or remaining material stored in the 3D printer) and receiving a payment command for purchasing material online. The third screen information 507 may include information on the amount of materials required in printing the printing object, based on the printing data.

According to the embodiment, the user can perform overall processes by using the mobile terminal, up to the purchasing of printing materials required based on the formed printing data, without separately identifying remaining materials stored in the 3D printer.

Figure 5A:
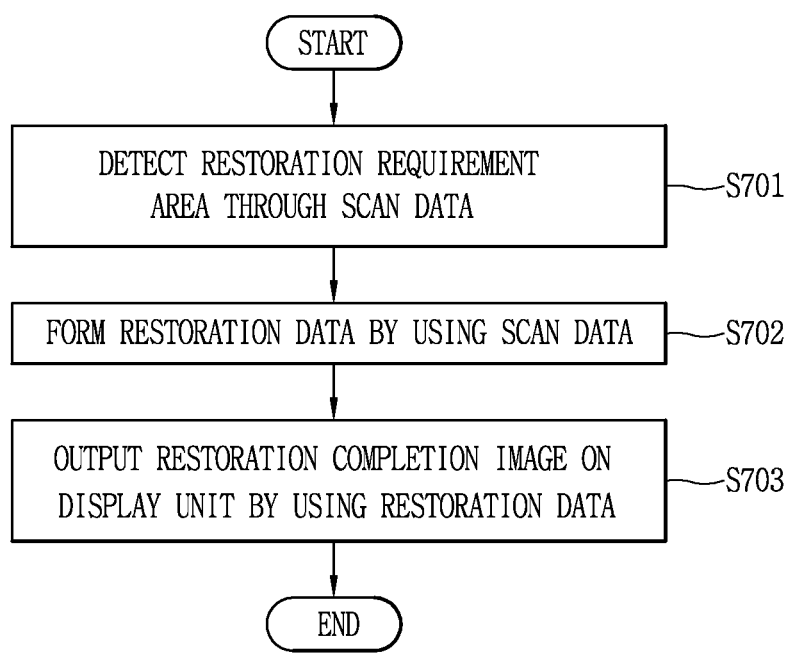
FIG. 5A is a flowchart illustrating a control method of complementing a restoration requirement area of a 3D shape by using scan data.
Figure 5B:
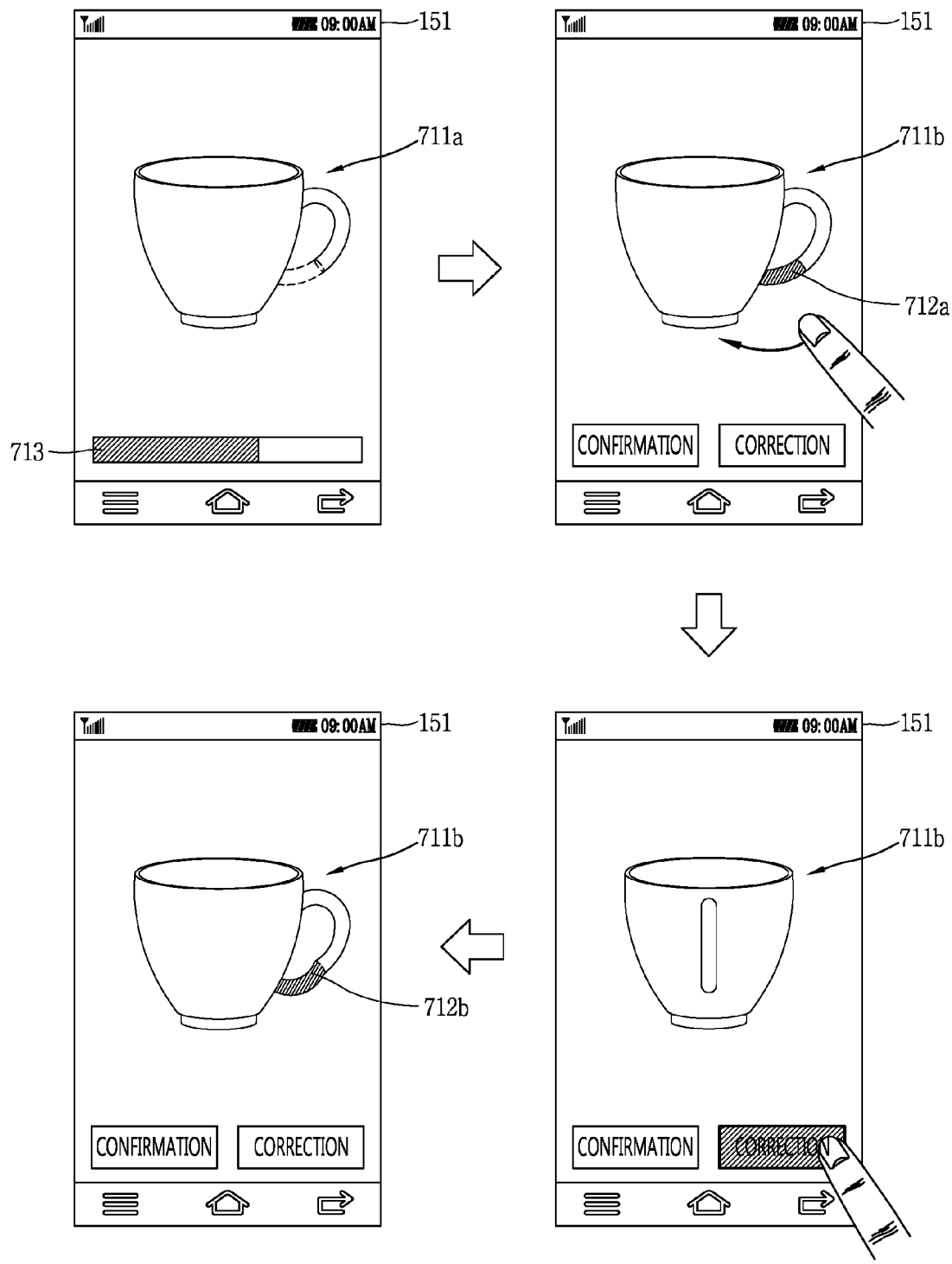
FIGS. 5B and 5C are conceptual diagrams illustrating the control method of FIG. 5A.
Figure 5C:
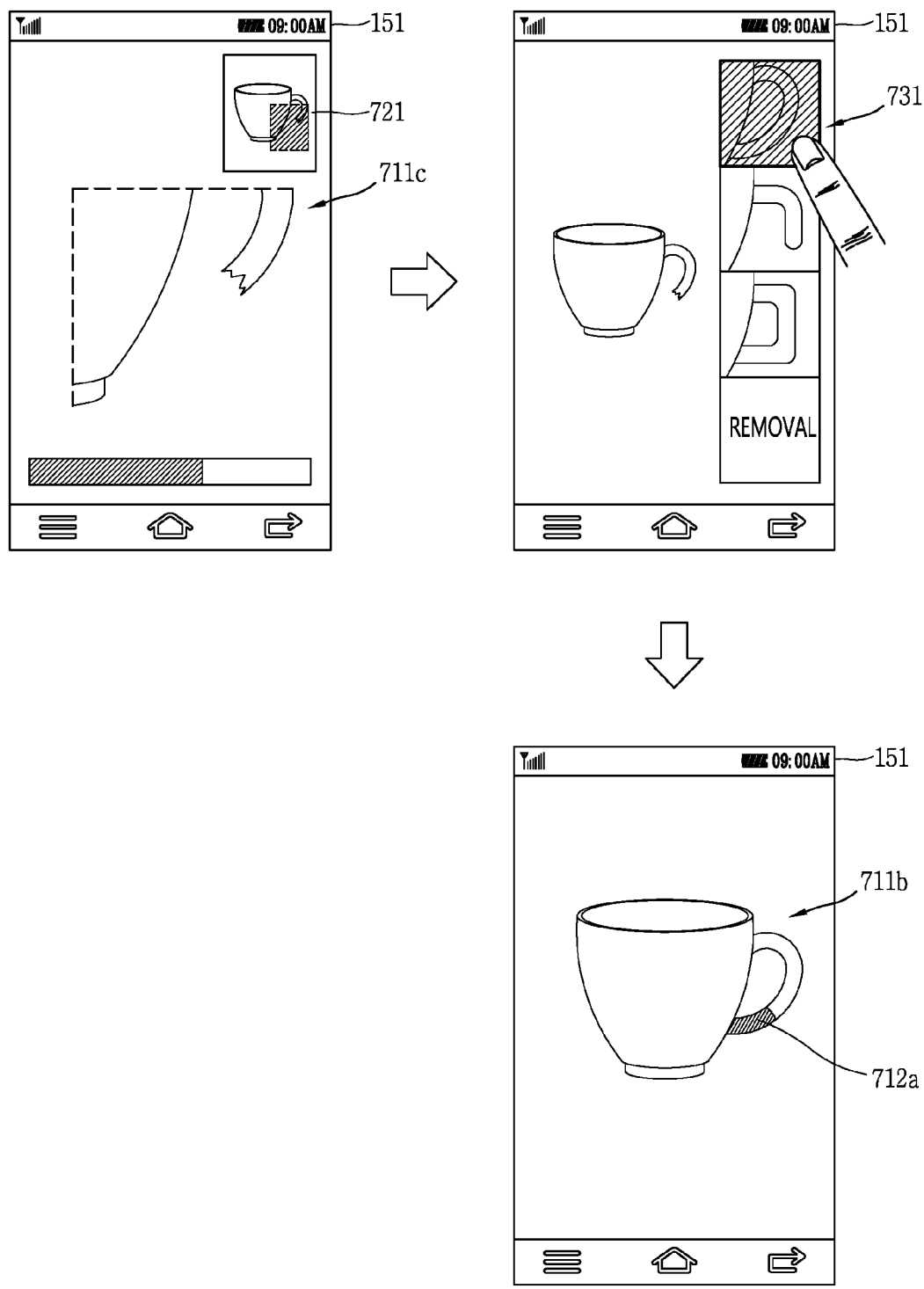

FIG. 5A is a flowchart illustrating a control method of complementing a restoration requirement area of a 3D shape by using scan data. FIGS. 5B and 5C are conceptual diagrams illustrating the control method of FIG. 5A. Referring to FIGS. 5A and 5B, the controller 180 detects a restoration requirement area through the scan data (S701). When the restoration requirement area is detected, the display unit 151 outputs a scan image 711a in which the restoration requirement area is marked. In these figures, the restoration requirement area is marked by a dotted line, but the method of marking the restoration requirement area is not limited thereto. For example, a specific effect (marking or flickering of a specific color) may be formed in the restoration requirement area, or tag information (including a text representing the reason why restoration is required) may be marked in the restoration requirement area.

The controller 180 forms restoration data by using the scan data (S702). The display unit 151 can output a progress status image 713 representing a formation status of the restoration data while the restoration data is formed. The progress status image 713 may be formed in the shape of a bar representing a progress degree where the restoration data is formed.

If the restoration data is formed, the controller 180 controls the display unit 151 to output a restoration completion image 711b by using the restoration data (S703). The restoration completion image 711b is displayed in the restoration requirement area, and includes a restoration image 712a corresponding to the restoration data. The restoration image 712a may be marked to be distinguished from other areas of the scan image, but the present disclosure is not limited thereto. For example, the restoration image may be marked not to be distinguished from the other areas, so that a user can feel a sense of unity. Alternatively, the restoration image may be marked to be distinguished or not to be distinguished from the other areas, based on a user's setting (or control command).

The controller 180 controls the display unit 151 to output scan images obtained by capturing the 3D shape in various directions, based on a specific touch applied to the restoration completion image 711b. Accordingly, the user can receive virtual images formed as the user views the restoration image in different directions.

The restoration completion image 711b may include an icon for receiving a touch so as to correct the restoration data. If a control command is applied to the icon for receiving a touch so as to correct the restoration data, the controller 180 forms another restoration data of the restoration requirement area. If the another restoration data is formed, the controller 180 outputs, on the display unit 151, another restoration image 712b corresponding to the another restoration data.

Here, the restoration data is formed by using the scan data. For example, data for a virtual shape extended based on data of areas around the restoration requirement area may be formed, or data for a shape substantially identical to an area symmetric to the restoration requirement area (based on the center of the 3D shape) may be formed as the restoration data.

Alternatively, the restoration data may be formed by using scan data of an area selected based on a touch applied to the scan image. In this instance, the restoration data may be formed substantially identical to the scan data. For example, when a restoration area is formed by one of a plurality of areas symmetric to each other, the user may select one area of a 3D shape for forming the restoration area. However, the method of forming the restoration data is not limited thereto.

Referring to FIG. 5C, another control method of forming restoration data will be described. If a restoration requirement area is detected, the controller 180 outputs an enlargement image 711c obtained by enlarging the restoration requirement area. The enlargement image 711c may include a map image 731 corresponding to the entire image in which an area corresponding to the enlargement image 711 is marked.

The controller 180 controls the wireless communication unit 110 to receive, from a specific server, a control window 731 including a 3D shape image for forming the restoration data by using scan data including the restoration requirement area and information on the kind of a 3D shape. The display unit 151 outputs the received control window 731 including at least one 3D shape image, and receives a user's touch. For example, when the captured 3D shape corresponds to a cup and when the restoration requirement area is a handle of the cup, the 3D shape image may correspond to an image of the handle of the cup.

The display unit 151 can output the scan image to which the 3D shape selected based on the touch is applied. The controller 180 forms restoration data based on the image of the selected 3D shape, and controls the display unit 151 to output a restoration completion image 711b including a restoration image 712a corresponding to the restoration data. According to the embodiment, since the user receives and refers to an image of an area to be restored based on the kind of a 3D shape, it is possible to form various restoration data, and more accurately print the restoration area.

Figure 6A:
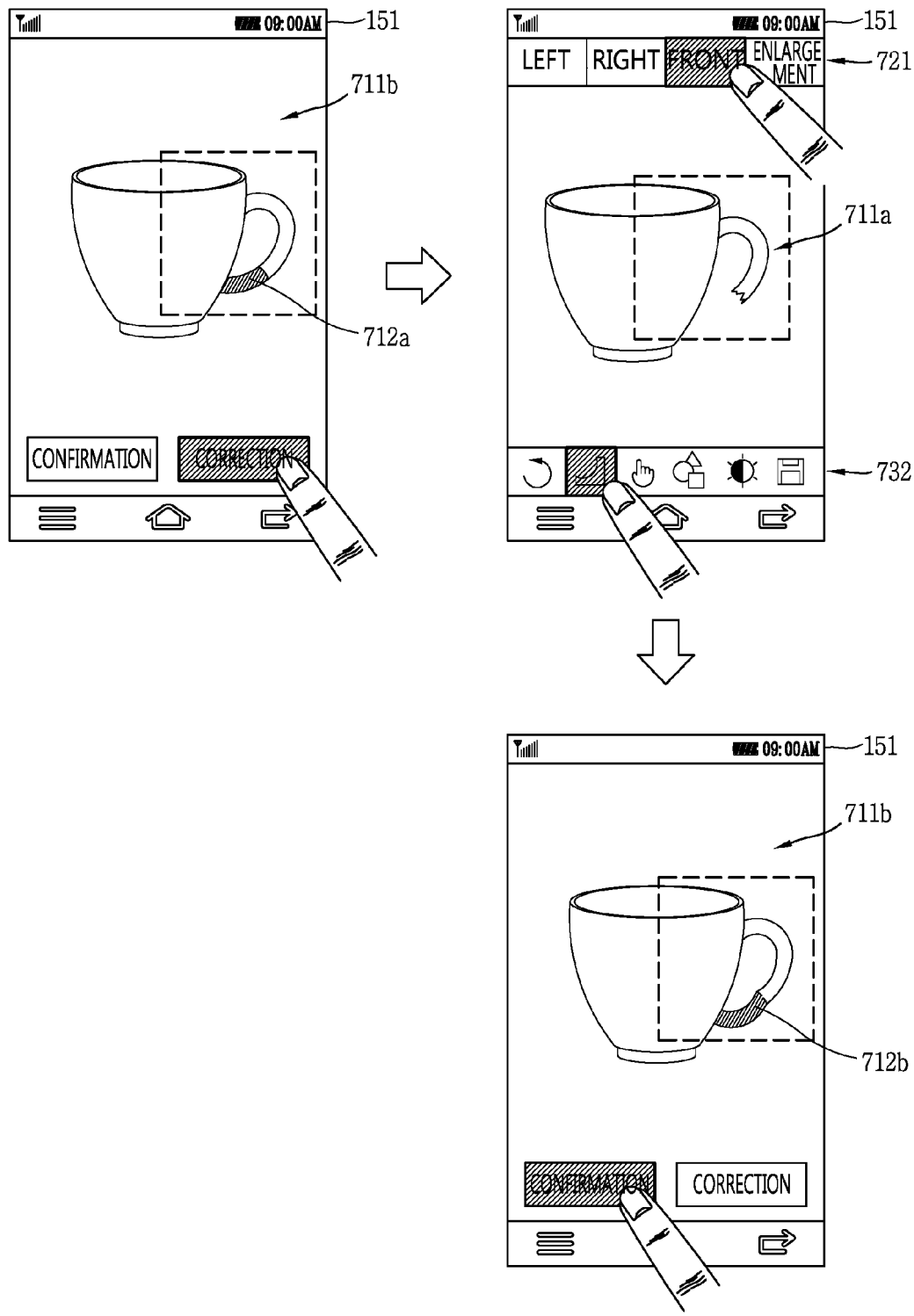
FIGS. 6A to 6C are conceptual diagrams illustrating a control method of forming restoration data according to an embodiment.
Figure 6B:
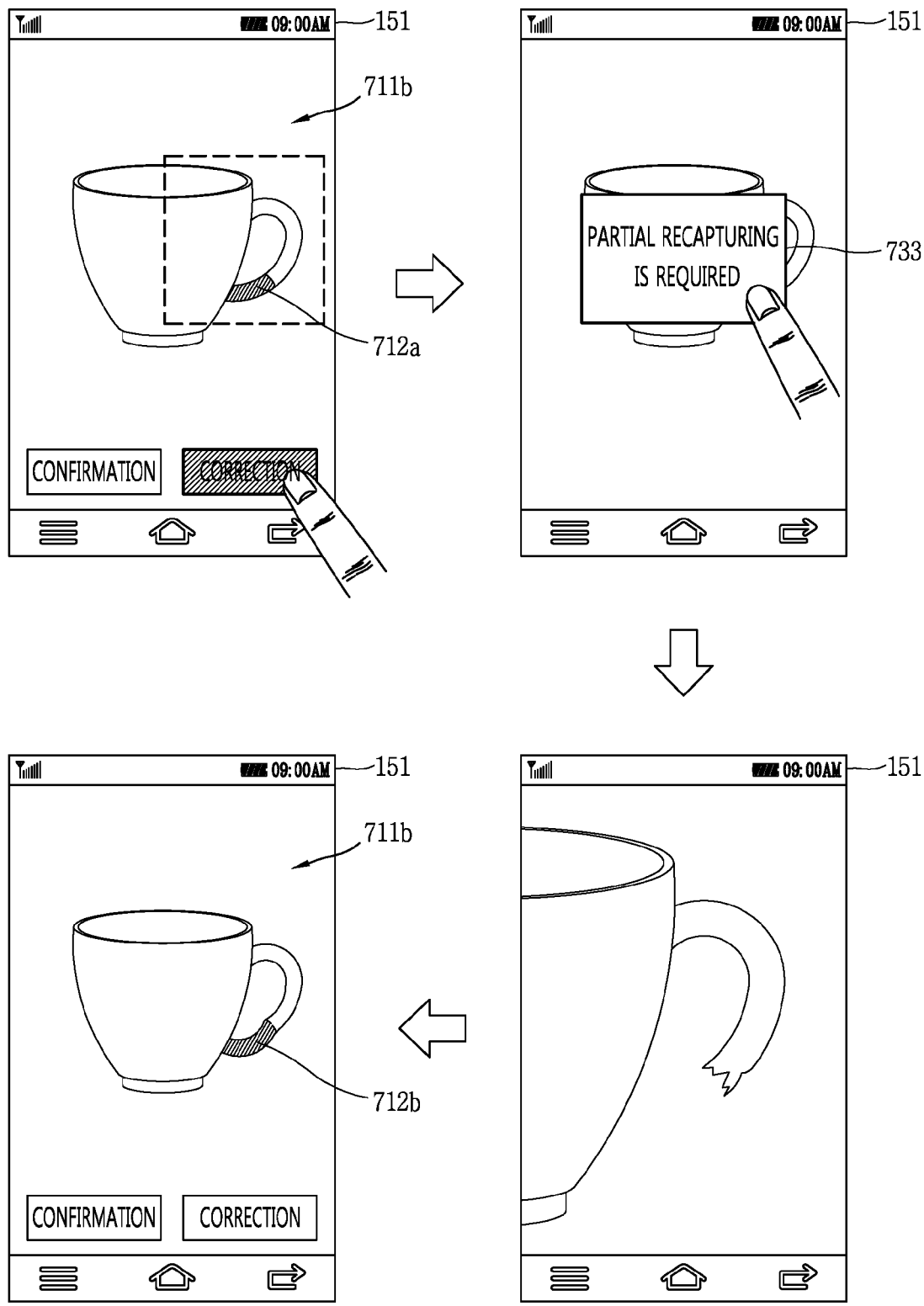
Figure 6C:
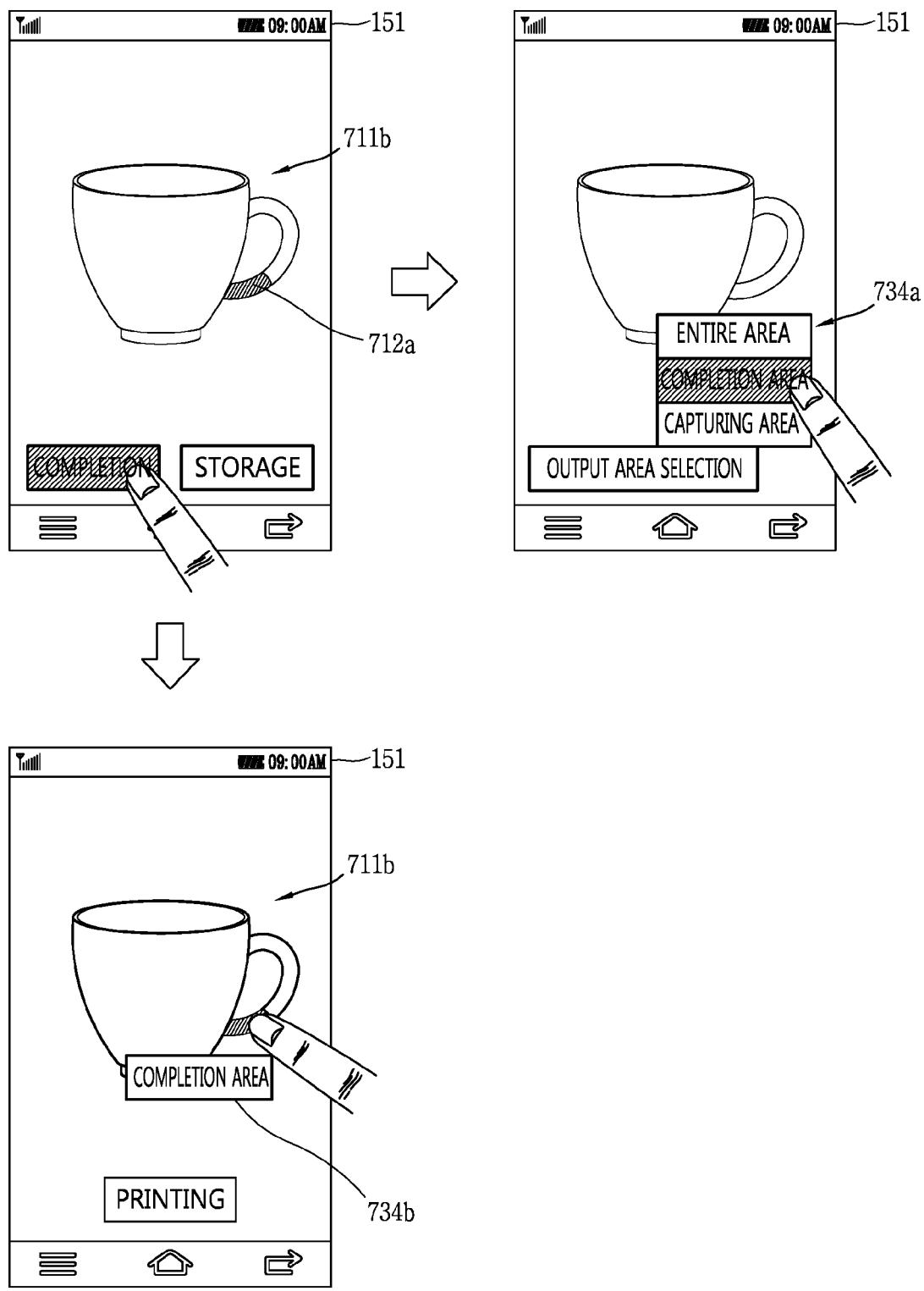

FIGS. 6A to 6C are conceptual diagrams illustrating a control method of forming restoration data according to an embodiment. Referring to FIG. 6A, the display unit 151 outputs the restoration completion image 711b including the restoration image 712a. When a control command for correcting the restoration image is received from the user, the display unit 151 converts the restoration completion image 711b into a scan image 711a in which a restoration requirement area is marked. The display unit 151 includes the scan image 711a, a control window 732 configured with a plurality of 3D shape images, and an area selection window 721 for selecting one area of a 3D shape.

The user may selectively output one of scan images captured in different directions of the 3D shape on the display unit 151 through the area selection window 721. Accordingly, the restoration requirement area can be recognized better, and the restoration image applied to the restoration requirement area can be more effectively recognized.

The 3D shape images included in the control window 732 include 3D shapes configured with various figures. The 3D shape images may include a function icon for executing a function capable of drawing a 3D shape through a touch process. The controller 180 forms restoration data through the control window 732, and controls the display unit 151 to output a restoration completion image 711b including another restoration image 712b corresponding to the restoration data. According to the embodiment, the user can correct restoration data by adding a desired shape to the restoration area.

Referring to FIG. 6B, when a correction command of restoration data is input from the user or when the formation of the restoration data is impossible, the controller 180 controls the display unit 151 to output a third guide window 733 for guiding recapturing. The third guide window 733 includes guide information on partial capturing of the restoration requirement area.

The controller 180 activates the camera 121. As the camera 121 is activated, at least one 3D image of one area of the 3D shape is collected. The controller 180 forms restoration data corrected based on the additionally collected image of the restoration requirement area, and controls the display unit 151 to output another restoration image 712b. According to the embodiment, it is possible to form more accurate restoration data based on additional capturing.

Referring to FIG. 6C, a control method of selecting a printing area on a restoration completion image will be described. When a restoration completion image 711b including the restoration image 712a is output on the display unit 151, the controller 180 can select a printing area based on a touch applied to the restoration completion image 711b. For example, the display unit 151 can output an icon for selecting an output area on the restoration completion image 711b. A selection list including the entire area, a restoration area, a capturing area, etc. of the restoration completion image is output on the display unit 151, based on the touch applied to the icon.

Alternatively, a printing area may be selected according to the range of a touch applied to the restoration completion image 711b. The controller 180 distinguishes a capturing image from a restoration image in the restoration completion image 711b, and sets, as the printing area, an area to which a user's touch is applied. In this instance, the display unit 151 can process the selected area to be highlighted. The display unit 151 can additionally display information 734b on the selected area.

According to the embodiment, user can entirely print a shape included in a scan image and selectively print only a shape corresponding to the restoration requirement area.

Figure 7A:
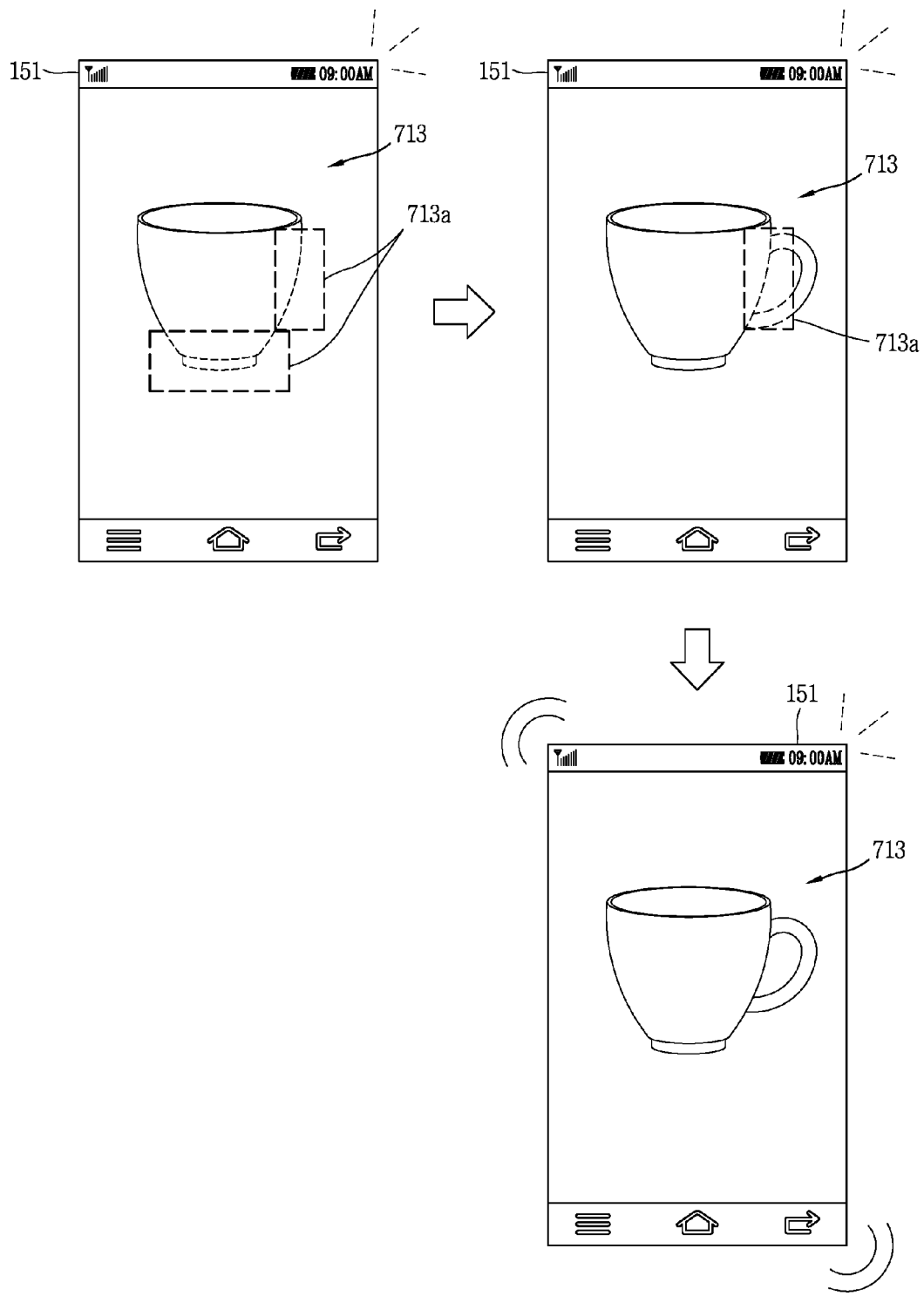
FIGS. 7A and 7B are conceptual diagrams illustrating a method of controlling capturing for forming scan data.
Figure 7B:
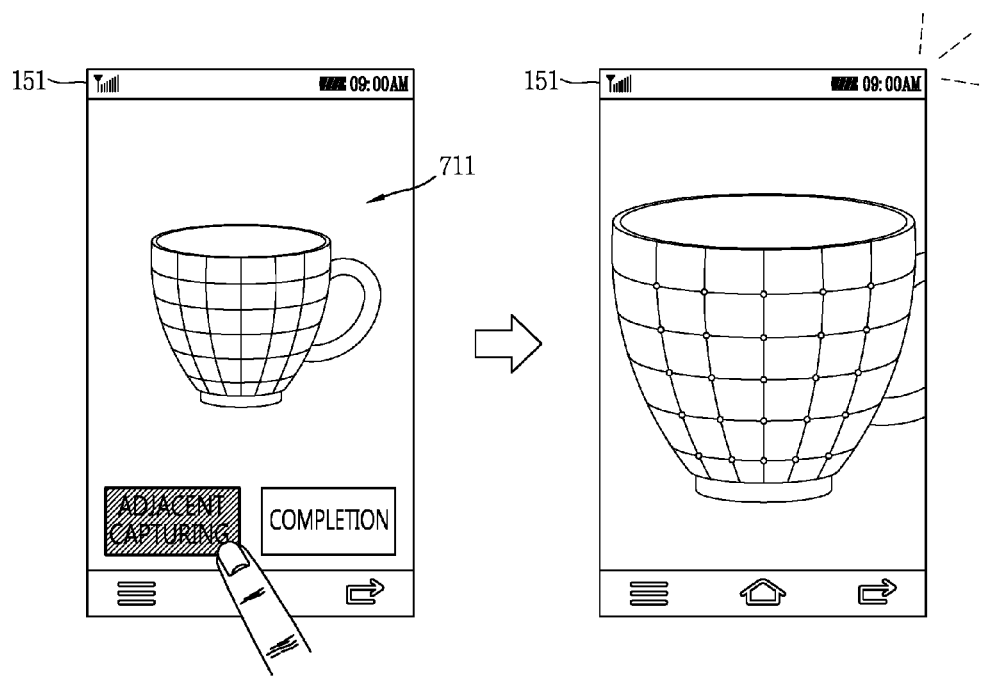

FIGS. 7A and 7B are conceptual diagrams illustrating a method of controlling capturing for forming scan data. Referring to FIG. 7A, the display unit 151 outputs, gradually (in real time), a scan image formed as a 3D shape is captured by the camera 121. In a state in which the scan image in a specific range or more is output, the display unit the display unit 151 can output a guide image 713a in an area in which the 3D shape is not captured and/or an area in which additional capturing (adjacent capturing) is required. The guide image 713a may correspond to an image of a specific shape, or may correspond to a visual effect. The guide image 713a is gradually disappeared as the capturing of the 3D shape is performed.

The guide image 713a may be formed with brightness on the display unit 151. For example, an area which it is required to capture is marked darkly. When scan data is collected by the capturing of the 3D shape, the corresponding area may be output brightly. The haptic module 153 outputs vibration when scan data of the 3D shape are all collected. According to the embodiment, the user can recognize an area additionally captured through the guide image. Thus, it is possible to form more accurate scan data.

Referring to FIG. 7B, the display unit 151 outputs a scan image 711 through scan data. When it is determined that adjacent capturing of the surface of the 3D shape is required based on the scan data, the controller 181 controls the display unit 151 to output an icon for controlling the adjacent capturing together with the scan image 711. Alternatively, when additional capturing is required based on the scan data, the display unit 151 can output one area on the scan image 171 to be blurred.

The camera 121 may be activated in an adjacent capturing mode, based on a control command for the additional capturing. According to the embodiment, when the surface of a 3D shape is complicated or has fine windings, adjacent capturing can be guided to the user, thereby forming more accurate scan data.

Figure 8:
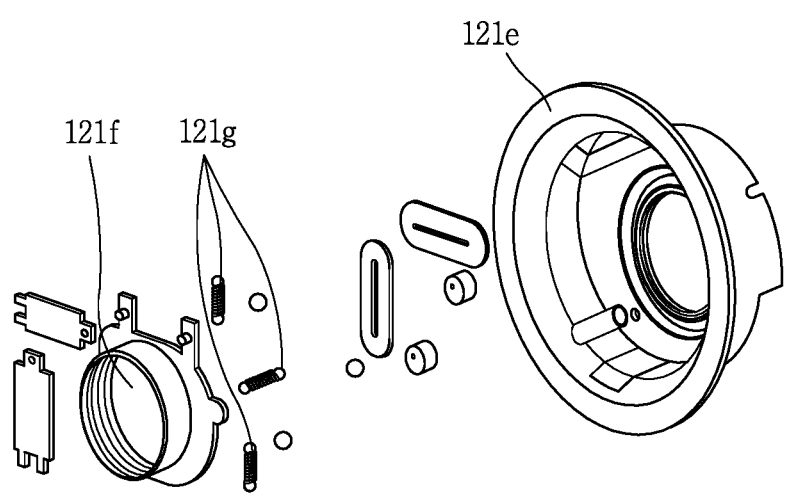
FIG. 8 is a conceptual diagram illustrating a structure of a camera including a buffering structure.

FIG. 8 is a conceptual diagram illustrating a structure of a camera including a buffering structure. Referring to FIG. 8, the camera may include a support member 121e, a lens module 121f, and an elastic member 121g. The elastic member 121g may be configured with a plurality of springs for elastically supporting the lens module 121f in the outer circumferential direction of the lens module 121f. Thus, it is possible to minimize movement of the lens module 121f while the mobile terminal moves so as to capture a 3D shape. Accordingly, it is possible to capture a more accurate image and minimize an error on an image with respect to overlapping areas of the 3D shape.

Meanwhile, the mobile terminal 100 according to the present disclosure may further include a movement sensor. The movement sensor may include at least one of an acceleration sensor, a geomagnetic sensor, and a gyro sensor. The movement sensor collects information on a posture, a change in relative location and direction, a motion, and a movement of the main body of the mobile terminal 100 which the camera captures a plurality of areas of the 3D shape. The controller 180 more accurately synthesizes a plurality images through information on the movement and the captured images, thereby forming scan data and a scan image.

Figure 9:
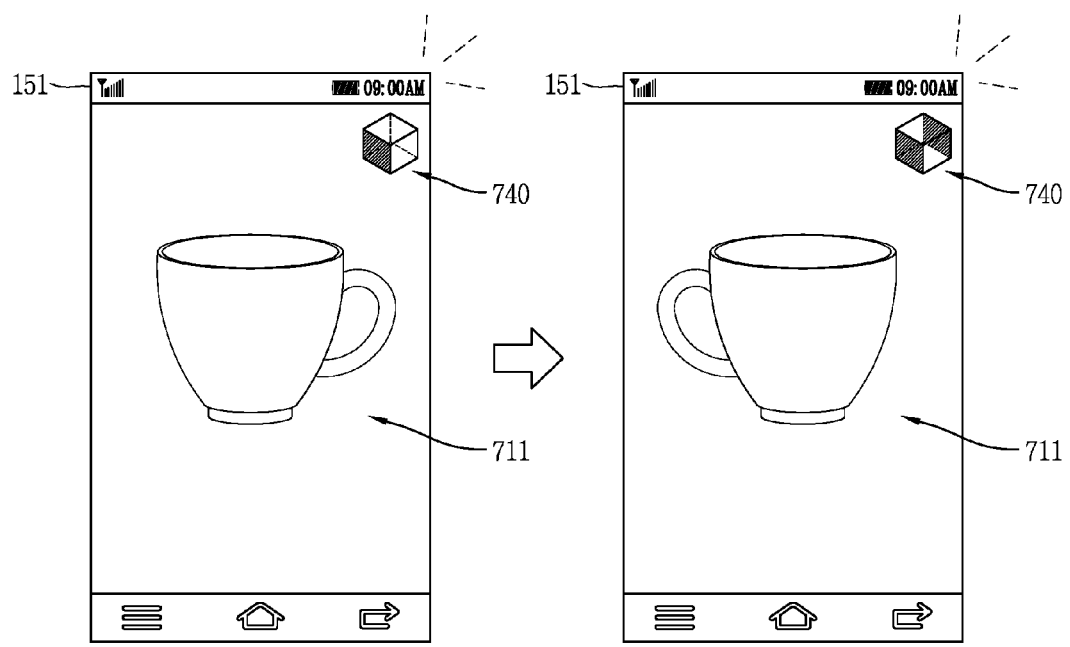
FIG. 9 is a conceptual diagram illustrating a control method of outputting a graphic image which marks a capturing area.

FIG. 9 is a conceptual diagram illustrating a control method of outputting a graphic image which marks a capturing area. The controller 180 outputs, on the display unit 151, a graphic image 740 configured with a plurality of surfaces together with a scan image 711, while the 3D shape is captured. For example, the graphic image 740 may be formed in a hexahedral shape. Each surface of the hexahedral graphic image 740 may correspond to each area divided area of the 3D shape. The graphic image 740 may be formed based on the location of a reference marker.

If a divided area of the 3D shape is captured, one surface of the graphic image 740, which corresponds to the captured area, is changed. For example, the color or brightness of the one surface may be changed. Thus, the user recognizes the graphic image 740, thereby additionally capturing one area of the 3D shape, which is not captured. Accordingly, the user can perform efficient capturing without capturing overlapping areas.

Figure 10:
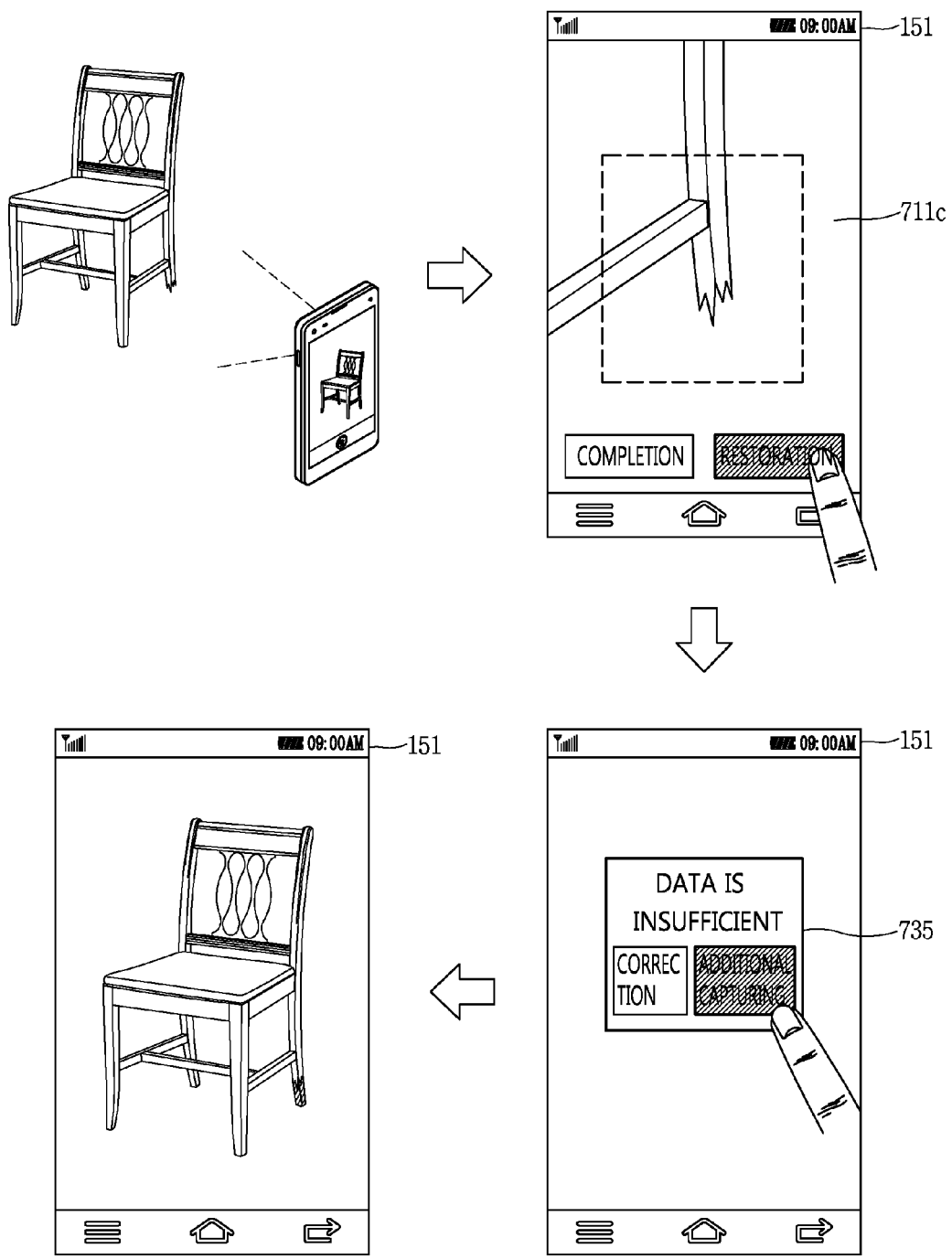
FIG. 10 is a conceptual diagram illustrating a control method of guiding additional capturing so as to form restoration data.

FIG. 10 is a conceptual diagram illustrating a control method of guiding additional capturing so as to form restoration data. When scan data for forming the restoration data is insufficient, the controller 180 controls the display unit 151 to output a fourth guide window 735 for guiding additional capturing.

The controller 180 can activate the camera 121 based on a control command applied to the fourth guide window 735. In addition, the display unit 151 can output an image of a restoration requirement area to be overlapped with a preview screen captured by the camera 121, thereby guiding a desired capturing area.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a main body;
a display unit disposed on one surface of the main body;
a 3D camera configured to capture an image of a 3D shape disposed together with reference markers; and
a controller configured to: create scan data based on distances to the image from the reference markers, display a scan image of the 3D shape based on the scan data while the 3D shape is captured, display a portion of the scan image corresponding to the captured image and a graphic image configured with a plurality of surfaces respectively corresponding to a plurality of divided areas of the 3D shape on the display unit, and change the display of some of the surfaces of the graphic image corresponding respectively to the plurality of divided areas of the 3D shape to represent a different area of the scan image of the 3D shape among a plurality of captured areas of the 3D shape.

2. The mobile terminal of claim 1, further comprising:
a memory configured to store reference data for relative locations of the reference markers captured through the 3D camera,
wherein the controller is further configured to create the scan data through analysis of the reference data and the image.

3. The mobile terminal of claim 2, wherein the 3D camera is further configured to form the image of the 3D shape, based on a time of flight (TOF) when an IR light source emitted by the mobile terminal is reflected from the 3D shape.

4. The mobile terminal of claim 1, further comprising:
a movement sensing unit configured to sense a movement of the main body while the 3D shape is captured,
wherein the controller is further configured to correct the scan data, based on the sensed movement of the main body.

5. The mobile terminal of claim 1, wherein the controller is further configured to form the graphic image in a hexahedral shape.

6. The mobile terminal of claim 1, further comprising:
a haptic module configured to output vibration when the plurality of areas of the 3D shape are all captured.

7. The mobile terminal of claim 1, wherein, when adjacent capturing of the 3D shape is required, the controller is further configured to display one area on the scan image on the display unit, in which the adjacent capturing is required, to be dark.

8. The mobile terminal of claim 1, wherein, when a restoration requirement area is detected based on the scan data, the controller is further configured to create restoration data through the scan data, and display a restoration completion image by using the restoration data on the display unit.

9. The mobile terminal of claim 8, wherein the controller is further configured to create the restoration data by using scan data of the one area, selected by a touch applied to the scan image.

10. The mobile terminal of claim 8, wherein the controller is further configured to create the restoration data by using scan data of an area symmetric to the restoration requirement area about the center of the 3D shape.

11. The mobile terminal of claim 8, wherein, when the restoration requirement area is detected, the controller is further configured to display a control window configured with a plurality of 3D shape images so as to create the restoration data, and display, in the restoration requirement area, one 3D shape image selected among the plurality of 3D shape images together with the scan image on the display unit.

12. The mobile terminal of claim 11, wherein the controller is further configured to receive the 3D shape image from a predetermined server, based on a kind of the 3D shape.

13. The mobile terminal of claim 8, wherein, when the restoration requirement area is detected, the controller is further configured to control the 3D camera to capture an area adjacent to the restoration requirement area in the 3D shape.

14. The mobile terminal of claim 8, wherein the controller is further configured to set a printing area, based on a touch applied on the display unit when the restoration completion image is displayed.

15. The mobile terminal of claim 14, wherein the controller is further configured to create the scan data and the restoration data as printing data printed by a 3D printer, based on the touch.

16. The mobile terminal of claim 1, wherein, in response to a specific touch being applied to the scan image, the controller is further configured to display some of images corresponding to the plurality of areas of the 3D shape on the display unit.

17. The mobile terminal of claim 16, wherein the controller is further configured to:
display a partial image corresponding to one area of the 3D shape on the display unit, and
display a graphic image representing the one area of the 3D shape together with the partial image on the display unit.

18. The mobile terminal of claim 1, wherein, in response to a control command for printing the scan image is applied, the controller is further configured to display a print setting screen on the display unit.

19. The mobile terminal of claim 18, further comprising:
a wireless communication unit configured to transmit, to the 3D printer, printing data formed by using the scan data,
wherein, when information on insufficiency of a printing material is received from the 3D printer, the controller is further configured to display an icon for purchase of the printing material on the display unit.

20. The mobile terminal of claim 19, wherein the controller is further configured to execute an application for purchase of the printing material or transmit information on purchase of the printing material to a predetermined server, based on a control command applied to the icon.

* * * * *